United States Patent [19]
Brew et al.

[11] Patent Number: 5,667,902
[45] Date of Patent: Sep. 16, 1997

[54] HIGH MOISTURE BARRIER POLYPROPYLENE-BASED FILM

[75] Inventors: Joseph Edward Brew, Newark; Jay Kin Keung, Macedon, both of N.Y.

[73] Assignee: Mobil Oil Corporation, Fairfax, Va.

[21] Appl. No.: 641,242

[22] Filed: Apr. 30, 1996

[51] Int. Cl.$^6$ .................................................. B32B 27/08
[52] U.S. Cl. .......................... 428/518; 428/500; 428/515; 428/516; 428/519; 428/520; 428/447
[58] Field of Search ................................ 428/515, 516, 428/560, 518, 519, 520, 447

[56] References Cited

U.S. PATENT DOCUMENTS

| | | |
|---|---|---|
| 3,926,878 | 12/1975 | Shimizu et al. . |
| 3,985,833 | 10/1976 | Agurio et al. . |
| 4,230,767 | 10/1980 | Isaka et al. ............................ 428/349 |
| 4,343,852 | 8/1982 | Isaka et al. ............................ 428/216 |
| 4,377,616 | 3/1983 | Ashcraft et al. ...................... 428/213 |
| 4,692,379 | 9/1987 | Keung et al. .......................... 428/349 |
| 4,720,420 | 1/1988 | Crass et al. ........................... 428/216 |
| 4,734,317 | 3/1988 | Bothe et al. ........................... 428/215 |
| 4,764,425 | 8/1988 | Balloni et al. ......................... 428/331 |
| 4,767,675 | 8/1988 | Cyr et al. .............................. 428/515 |
| 4,786,533 | 11/1988 | Crass et al. ............................ 428/13 |
| 4,786,562 | 11/1988 | Kakugo et al. ........................ 428/516 |
| 4,869,938 | 9/1989 | Usami et al. .......................... 428/34.3 |
| 4,911,976 | 3/1990 | Park et al. ............................. 428/216 |
| 4,921,749 | 5/1990 | Bossaert et al. ....................... 428/216 |
| 4,927,885 | 5/1990 | Hayashida et al. .................... 525/211 |
| 4,975,329 | 12/1990 | Bothe et al. ........................... 428/215 |
| 4,983,447 | 1/1991 | Crass et al. ........................... 428/216 |
| 5,066,434 | 11/1991 | Liu et al. ................................ 364/37 |
| 5,068,155 | 11/1991 | Yamada et al. . |
| 5,084,352 | 1/1992 | Percec et al. . |
| 5,085,943 | 2/1992 | Crighton et al. . |
| 5,091,237 | 2/1992 | Schloegl et al. ...................... 428/215 |
| 5,096,770 | 3/1992 | Bothe . |
| 5,100,937 | 3/1992 | Kubo et al. . |
| 5,118,566 | 6/1992 | Wilhelm et al. ...................... 428/335 |
| 5,147,936 | 9/1992 | Peszkin et al. ........................ 525/240 |
| 5,155,160 | 10/1992 | Yeh et al. . |
| 5,180,626 | 1/1993 | Ishibashi et al. . |
| 5,213,744 | 5/1993 | Bossaert . |
| 5,234,733 | 8/1993 | Schloegl et al. . |
| 5,292,561 | 3/1994 | Peiffer et al. ......................... 428/35.1 |
| 5,292,563 | 3/1994 | Peiffer et al. ......................... 428/35.1 |
| 5,364,704 | 11/1994 | Murschall et al. .................... 428/516 |
| 5,372,882 | 12/1994 | Peiffer et al. . |
| 5,428,780 | 6/1995 | Wilkie et al. ......................... 428/515 |
| 5,433,983 | 7/1995 | Schuhmann et al. ................. 428/357 |
| 5,441,807 | 8/1995 | Brandt et al. ......................... 428/349 |
| 5,500,282 | 3/1996 | Heffelfinger et al. ................. 428/439 |

FOREIGN PATENT DOCUMENTS

| | | |
|---|---|---|
| 993387 | 5/1965 | United Kingdom . |
| 1024718 | 4/1966 | United Kingdom . |
| 1061366 | 3/1967 | United Kingdom . |
| 1231861 | 5/1971 | United Kingdom . |
| 1318137 | 5/1973 | United Kingdom . |
| 2028168 | 3/1980 | United Kingdom . |

OTHER PUBLICATIONS

Brochure, Arkon—A Film And Resin Additive, Mitsui Plastics, Inc. (undated).

*Primary Examiner*—Ralph H. Dean
*Attorney, Agent, or Firm*—Dennis P. Santini

[57] ABSTRACT

A polymeric film having improved moisture barrier characteristics and enhanced mechanical properties. The film has a base layer which includes a blend of a high crystallinity polypropylene having an isotactic stereoregularity greater than about 93%, a conventional isotactic polypropylene having an isotactic stereoregularity of from about 90% to about 93%, and up to about 9% by weight of a resin modifier.

14 Claims, No Drawings

HIGH MOISTURE BARRIER POLYPROPYLENE-BASED FILM

BACKGROUND OF THE INVENTION

The present invention relates to a polypropylene-based multilayer film which exhibits improved moisture barrier properties and enhanced mechanical properties.

Polymeric films are used in many commercial applications. One particularly important application is the packaging of food products. Films employed in the food packaging industry are chosen and/or designed to provide characteristics necessary for proper food containment. Such characteristics include water vapor barrier properties, oxygen and gas barrier properties and flavor and aroma barrier properties.

Polypropylene is a polymer commonly employed in the manufacture of films used in the food packaging industry. In the case of multilayer films, polypropylene is typically used in the base or core layer. Often the polypropylene layer is modified to obtain desired characteristics which are not inherent in unmodified polypropylene. For example, resin modifiers and/or additives may be blended with the polypropylene.

Attempts to vary the characteristics of polypropylene are often directed towards improving the moisture barrier of the resultant film. To this end, it is known that blending polypropylene with a resin modifier will provide such improvements. Typically, from about 10% to about 20% resin modifier must be added to the film to achieve the desired reduction in water vapor transmission.

However, the addition of the resin modifier, within the aforementioned ranges, is not without its disadvantage. Particularly, at the loading ranges typically employed in the art, the polypropylene suffers a significant decrease in dimensional stability. This in turn hinders the machinability and processability of the resultant films, resulting in increased manufacturing costs and/or films of inferior quality.

The mechanical properties of a polymeric film are another important characteristic, particularly with respect to such applications as wrappings for tobacco products. Films having enhanced mechanical properties facilitate handling and packaging because such films are more readily accommodated by typical industrial machinery. Attempts have been made to enhance the mechanical properties of polypropylene-based films (as measured by the stiffness and moduli of the film) through increased orientation and/or by the addition of additives. However, increased orientation often increases the likelihood of film splitting during manufacturing, while the addition of additives typically provides limited enhancement of mechanical properties but can negatively impact other film characteristics such as dimensional stability and clarity.

Commonly-owned copending U.S. patent application Ser. Nos. 08/490,081 filed Jun. 13, 1995 and 08/542,209 filed Oct. 12, 1995 disclose polymeric film structures having a base layer of high crystallinity polypropylene and up to about 8% by weight of a resin modifier. Skin layers may be adhered to opposing surfaces of the base layer. The disclosed film structures exhibit improved moisture barrier properties and enhanced mechanical properties, while maintaining dimensional stability, machinability, processability and clarity. However, the use of high crystallinity polypropylene in the disclosed film structures increases the difficulty of manufacturing the structures, particularly with respect to such manufacturing steps as stretching and slitting of the films. The use of high cystallinity polypropylene also increases the cost of the film structures.

Thus, there is still a need in the art for a resin modified polypropylene-based film which may be readily manufactured at reduced cost, while exhibiting improved moisture barrier properties, enhanced mechanical properties, dimensional stability, machinability, processability and clarity.

SUMMARY OF THE INVENTION

The present invention, which addresses the needs of the prior art, relates to a polymeric film having improved moisture barrier characteristics and enhanced mechanical properties. The film has a base layer which includes a blend of a first polypropylene polymer having an isotactic stereoregularity greater than about 93%, a second polypropylene polymer having an isotactic stereoregularity of from about 90% to about 93%, and a resin modifier at a loading level up to about 9% by weight of the base layer.

In one preferred embodiment, the base layer includes from about 60% to about 94% and preferably from about 70% to about 88% by weight of the first polypropylene, from about 3% to about 37% and preferably from about 4% to about 26% by weight of the second polypropylene, and from about 3% to about 9% and preferably from about 4% to about 8% by weight of resin modifier. The resin modifier is preferably a hydrogenated hydrocarbon.

In another preferred embodiment, at least one skin layer is adhered to the base layer, preferably with a coating layer thereon. The skin layer is preferably formed from an ethylene-propylene random copolymer or an ethylene-propylene-butene-1 terpolymer. In one particularly preferred embodiment, the skin layer includes an amount of an antiblocking agent effective to reduce blocking of the film when wound and an amount of a silicone oil effective to maintain a low coefficient of friction on the exposed surface thereof.

As a result, the present invention provides a polypropylene-based film structure exhibiting improved moisture barrier properties and enhanced mechanical properties. These improved properties are obtained without a loss of dimensional stability and without a negative impact on other film characteristics such as clarity. Thus, the film structure exhibits a high degree of machinability and processability, providing higher quality films and/or reduced manufacturing costs. Finally, the film structure may be readily manufactured.

DETAILED DESCRIPTION OF THE INVENTION

As disclosed in commonly-owned copending U.S. patent application Ser. Nos. 08/490,081 filed Jun. 13, 1995 and 08/542,209 filed Oct. 12, 1995, incorporated herein by reference, polymeric film structures formed from HCPP exhibit unexpectedly large decreases in water vapor transmission with small additions of resin modifier. The moisture barrier increases as the loading level of resin modifier is increased, up to a maximum of about 8% resin modifier. That is, loading levels of greater than about 8% do not provide further substantial increases in moisture barrier. Moreover, the HCPP-based film structures also provide enhanced mechanical properties without suffering from losses in dimensional stability and clarity, as is common in prior art film structures which may require upwards of 20% resin modifier to achieve maximum moisture barrier. However, the use of HCPP in the film structure increases the difficulty of manufacturing the film structures, particularly with respect to such manufacturing steps as stretching and slitting.

It has been discovered herein that the HCPP-based film structures disclosed in commonly-owned copending U.S.

patent application Ser. Nos. 08/490,081 and 08/542,209 can be further improved by blending therein an amount of conventional isotactic polypropylene. More particularly, the present invention is prepared by blending high crystallinity polypropylene (HCPP) and conventional isotactic polypropylene (PP) with a resin modifier to form a base layer precursor. The HCPP has an isotactic stereoregularity of greater than about 93%, preferably from about 94% to about 98%, while the PP has an isotactic stereoregularity of from about 90% to about 93%. The blended base layer provides a significant increase in manufacturing efficiency, while maintaining the enhanced properties achieved in the disclosed structures of the commonly-owned co-pending applications. Moreover, the blended base layer provides a significant reduction in cost, both in terms of materials and manufacturing costs.

The blend of HCPP and PP preferably includes an amount of HCPP effective to provide the base layer with a moisture barrier versus resin modifier loading level curve having a substantially zero slope at loading levels of resin modifier greater than about 9%. That is, a plot of water vapor transmission rate (WVTR) against % resin modifier shows an unexpectedly large initial decrease in water vapor transmission up to loading levels of about 9%. At loading levels of greater than about 9% resin modifier, the slope of the plot becomes substantially zero, whereby increasing the loading level does not provide further substantial increases in moisture barrier. With respect to the slope of the plot, the term substantially zero slope is defined herein as meaning that less than approximately 10% and, more preferably, less than approximately 5%, additional moisture barrier is achieved as the loading level of resin modifier is increased above about 9%.

The base layer preferably includes from about 60% to about 94% by weight of HCPP and, more preferably, from about 70% to about 88% by weight of HCPP. The remaining percentage of the base layer is formed of PP, preferably in an amount effective to plasticize the base layer and thus increase the processability of the resultant extruded film structure and, more preferably, in an amount at least as great as the amount of resin modifier present in the base layer.

Commercially suitable PPs include Fina 3371 (available from Fina Oil and Chemical Co. of Dallas, Tex.), Exxon 4612 and Exxon 4052 (available from Exxon Chemical Co. of Houston, Tex.) and Amoco 6361 (available from Amoco Chemical Co. of Chicago, Ill.). Commercially suitable HCPPs include Amoco 9117 and Amoco 9119 (available from Amoco Chemical Co. of Chicago, Ill.), and Chisso HF5010 and Chisso XF2805 (available from Chisso Chemical Co., Ltd. of Tokyo, Japan). Suitable HCPPs are also available from Solvay in Europe.

The HCPP has a high isotactic stereoregularity, resulting in higher crystallinity than conventional isotactic polypropylene, i.e. greater than about 93%. (Conventional isotactic polypropylene is defined herein as having an isotactic stereoregularity of from about 90% to about 93%). The HCPP thus exhibits higher stiffness, surface hardness, lower deflection at higher temperatures and better creep properties than conventional isotactic polypropylene. Further information relating to HCPP, including methods for preparation thereof, is disclosed in U.S. Pat. No. 5,063,264, incorporated herein by reference.

For purposes of the present invention, stereoregularity can be determined by IR spectroscopy according to the procedure set out in "Integrated Infrared Band Intensity Measurement of Stereoregularity in Polypropylene," J. L. Koenig and A. Van Roggen, Journal of Applied Polymer Science, Vol. 9, pp. 359–367 (1965) and in "Chemical Microstructure of Polymer Chains," Jack L. Koenig, Wiley-Inerscience Publication, John Wiley and Sons, New York, Chichester, Brisbane, Toronto. Stereoregularity can also be determined by decahydronaphthalene (decalin) solubility and nuclear magnetic resonance spectroscopy (NMR).

As mentioned, the HCPP and PP components are blended with a resin modifier to form the base layer precursor. The resin modifier is present in an amount of up to about 9% by weight, preferably from about 4% to about 8% by weight, and more preferably about 6% by weight. The blending may be accomplished by the direct feeding of HCPP, PP and resin modifier into the film extruder or by use of a masterbatch. One preferred method of blending the components utilizes a masterbatch formed of PP and resin modifier, e.g., 80% PP and 20% resin modifier. The masterbatch is then blended with HCPP, which reduces the concentrations of both the PP and resin modifier to the final desired levels.

The resin modifier is preferably a low molecular weight hydrogenated hydrocarbon which is compatible with the HCPP and PP polymers and which provides the desired enhancement of film properties. The preferred resin modifier has a number average molecular weight less than about 5000, preferably less than about 2000, and more preferably from about 500 to about 1000. The resin modifier can be natural or synthetic and preferably has a softening point of from about 60° C. to about 180° C. Particularly suitable hydrocarbons which can be subsequently hydrogenated are the hydrocarbon resins. Preferred hydrocarbon resins include among others petroleum resins, terpene resins, styrene resins and cyclopentadiene resins.

Examples of commercially available hydrogenated hydrocarbon resins suitable for use in the present invention are those sold under the trademarks PICCOLYTE, REGALREZ and REGALITE by Hercules Corporation of Delaware and under the trademark ESCOREZ by Exxon Chemical Company of Houston, Tex.

One particularly preferred resin modifier is referred to herein as a saturated alicyclic resin. The saturated alicyclic resins are obtained by the hydrogenation of aromatic hydrocarbon resins. The aromatic resins are themselves obtained by polymerizing reactive unsaturated hydrocarbons containing, as the principal component, aromatic hydrocarbons in which the reactive double bonds are generally in side-chains. More particularly, the alicyclic resins are obtained from the aromatic resins by hydrogenating the latter until all, or almost all, of the unsaturation has disappeared, including the double bonds in the aromatic rings.

The saturated alicyclic resins used in the present invention have a softening point from about 85° C. to about 140° C., and preferably from about 100° C. to about 140° C., as measured by the ball and ring method. Examples of commercially available saturated alicyclic resins suitable for use in the present invention are those sold under the trademark ARKON-P by Arakawa Forest Chemical Industries, Ltd. of Japan.

In one preferred embodiment, at least one skin layer of an olefinic polymer is adhered to at least one side of the base layer. The skin layer is preferably coextruded with the base layer. In an additional preferred embodiment, skin layers are simultaneously co-extruded on both sides of the base layer.

In a still further preferred embodiment, a coating is applied to the outer surface of the skin layer(s). An acrylic coating, which provides improved printability, machinability and aroma barrier characteristics, may be applied to one of the skin layers. A heat seal coating such as ethylene methyl acrylate (EMA) or ethylene acrylic acid (EAA) may be applied to the other skin layer. Other suitable coatings include polyvinylidene chloride (PVDC), polyvinyl alcohol (PVOH) and low temperature heat seal coatings, as disclosed in commonly-owned U.S. Pat. No. 5,419,960 incorporated herein by reference.

Suitable olefinic polymers utilized for the skin layer(s) include i) ethylene homopolymers, ii) copolymers of ethylene and propylene, iii) copolymers of ethylene or propylene and butylene or another alphaolefin having 5 to 10 carbon atoms, iv) terpolymers of ethylene, propylene and butylene or another alpha-olefin having 5 to 10 carbon atoms, and v) mixtures thereof.

Olefinic polymers which are particularly preferred for the skin layer(s) include ethylene-propylene copolymers with propylene as the main constituent and an ethylene content of about 2 to 10% by weight (relative to the weight of the copolymer), propylene-butylene copolymers with propylene as the main constituent and a butylene content of about 0.5 to 25% by weight (relative to the weight of the copolymer), and ethylene-propylene-butene-1 terpolymers with propylene as the main constituent, about 0.5 to 7% by weight of ethylene and about 5 to 30% by weight of butene-1 (each time relative to the weight of the terpolymer), and mixtures of these polymers. The co- and terpolymers are preferably random polymers.

In order to further improve certain properties of the resultant film, effective amounts of additives such as antiblocking agents, antistatic agents and/or slip agents may be contained in the base layer and/or in the skin layer(s).

Preferred antiblocking agents include silica, talc, clay, sodium aluminum silicate, and conventional inorganic antiblocks. Other suitable antiblocking agents include inorganic additives, such as silicon dioxide, calcium carbonate, magnesium silicate, aluminum silicate, calcium phosphate, and the like, and/or incompatible organic polymers, such as polyamides, polyesters, polycarbonates and the like.

Preferred antistatic agents include alkali alkane sulfonates and essentially straight-chain, saturated aliphatic tertiary amines possessing aliphatic radicals with 10 to 20 carbon atoms and being substituted by 2-hydroxyalkyl-($C_1$ to $C_4$) groups. Preferred amines are N,N-bis-(2-hydroxyethyl)-alkylamines having 10 to 20, preferably 12 to 18, carbon atoms in their alkyl groups. The effective amount of antistatic agent varies in the range from about 0.05 to 3% by weight, relative to the weight of the layer.

Preferred slip agents include higher aliphatic acid amides, higher aliphatic acid esters, waxes, metallic soaps and silicone oils such as polydimethylsiloxane. The effective added amount of lubricant varies from about 0.1% to 2% by weight.

In one embodiment of the present invention, the film structure includes a pair of skin layers adhered to opposing sides of the core layer. Each of the skin layers includes an antiblocking agent (e.g., silica) in an amount effective to reduce blocking of the wound film and at least one of the skin layers includes a silicone oil (e.g., a polydimethylsiloxane) in an amount effective to maintain a low coefficient of friction on the exposed surface(s) of the skin layer(s). The antibocking agent is preferably present in an amount of from about 0.1% to about 0.3% by weight. The silicone oil is present in an amount of from about 0.5% to about 2.0% by weight, and preferably from about 0.8% to about 1.2% by weight, and has a viscosity of from about 350 to about 1,000,000 centistokes, and preferably from about 10,000 to about 60,000 centistokes. If the silicone oil is added to both skin layers, an ABA structure is produced. In those embodiments in which silicone oil is added to only one of the skin layers (resulting in an ABC structure), an amount of oil may still be transferred to the opposing skin layer upon winding of the film. In this particular ABC structure, the non-oil containing side may be flame or corona treated prior to winding.

The multilayer films of the present invention may be prepared employing commercially available systems for coextruding resins. As mentioned, the blended PP, HCPP and resin modifier are preferably coextruded with at least one second polymer which forms the skin layer. The polymers can be brought to the molten state and coextruded from a conventional extruder through a flat sheet die, the melt streams being combined in an adapter prior to being extruded from the die. After leaving the die orifice, the multilayer film structure is quenched.

The film structure of the present invention is preferably biaxially oriented. In one preferred embodiment, the film structure is stretched from about 4.5 to about 6 times in the machine direction (MD) and from about 6 to about 13 times in the transverse direction (TD). The overall orientation (MD×TD) preferably ranges from about 25 to 80. After orientation, the edges of the film can be trimmed and the film wound onto a core.

The film structures of the present invention also exhibit unexpectedly increased stiffness and moduli (MD and TD) over film structures having conventional isotactic polypropylene-based core layers. The increased stiffness and moduli provide the film structure with enhanced mechanical properties which, in turn, facilitate subsequent handling and packaging. Moreover, the increases in MD and TD moduli are accomplished at relatively low orientation, thus reducing manufacturing costs and the associated likelihood of splitting.

The blended base layer of the present invention also increases line operability and line percentage uptime, such improvements being observed during manufacture of the film structures of the present invention. For example, the blended base layer reduces the force necessary to stretch the film and in addition facilitates edge trimming of the extruded film, as compared to the films disclosed in commonly-owned copending U.S. application Ser. Nos. 08/490,081 filed Jun. 13, 1995 and 08/542,209 filed Oct. 12, 1995. These improvements provide further manufacturing cost reductions. It is to be noted that these improved properties are obtained even while maintaining the improved moisture barrier properties demonstrated in the examples set forth below and without negatively impacting other film characteristics such as dimensional stability and clarity. Finally, the blended base layer may provide additional savings in terms of reduction in material cost.

The film structures of the present invention are formed having a thickness ranging from about 10 microns to about 60 microns, preferably from about 15 microns to about 50 microns.

EXAMPLES

Water Vapor Transmission Rate (WVTR) in each of the following examples was measured at 100° F. and 90% Relative Humidity (ASTM F 372) and is expressed in g/100 $in^2$/day/mil.

Example 1

Sample 1 was produced to demonstrate the moisture barrier of a conventional isotactic polypropylene-based film structure. A core layer of an isotactic polypropylene (Fina 3371) having a thickness of about 23.75 microns was coextruded with skin layers of an ethylene-propylene random copolymer (Fina 8573HB) each having a thickness of about 0.6 microns to produce an ABA extrudate. The ABA extrudate was stretched 4.3 times in the machine direction and 9 times in the transverse direction.

| Sample | Core Layer | Resin Modifier (%) | WVTR (Ambient) | WVTR (Aged) |
|---|---|---|---|---|
| 1 | Fina 3371 | 0 | .311 | .311 |

Example 2

Samples 2a–2c were produced to demonstrate the moisture barrier of conventional polypropylene-based film structures containing varying levels of resin modifier. Core layers of an isotactic polypropylene (Fina 3371) having a thickness of 18.8 microns and varying levels of a terpene polymer (PICCOLYTE C-115) added by melt blending were coextruded with skin layers of an ethylene-propylene random copolymer (Fina 8573) each having a thickness of 0.6 microns to produce an ABA structure. The ABA extrudate was stretched 4.3 times in the machine direction and 9 times in the transverse direction.

| Sample | Core Layer | Resin Modifier (%) | WVTR (Ambient) | WVTR (Aged) |
|---|---|---|---|---|
| 2a | Fina 3371 | 0 | — | 0.325 |
| 2b | Fina 3371 | 10 | — | 0.27 |
| 2c | Fina 3371 | 20 | — | 0.25 |

Example 3

Sample 3 was produced to demonstrate the moisture barrier of a HCPP-based film structure. Example 1 was repeated using a core layer of a high crystallinity polypropylene (Amoco 9117).

| Sample | Core Layer | Resin Modifier (%) | WVTR (Ambient) | WVTR (Aged) |
|---|---|---|---|---|
| 3 | Amoco 9117 | 0 | .246 | .218 |

Example 4

Samples 4a–4j were produced to demonstrate the moisture barrier of HCPP-based film structures containing varying levels of resin modifier. A masterbatch of 80% HCPP (Amoco 9218) and 20% resin modifier (ARKON P-115) was blended with additional HCPP (Amoco 9218) and thereafter coextruded with skin layers of an ethylene-propylene random copolymer (Fina 8573HB) to produce an ABA extrudate. The ABA extrudate was stretched 4.3 times in the machine direction and 9 times in the transverse direction.

| Sample | Film Thickness (microns) | HCPP (%) | Resin Modifier (%) | WVTR (Ambient) | WVTR (Aged) |
|---|---|---|---|---|---|
| 4a | 19.8 | 94 | 6 | .230 | .202 |
| 4b | 19.8 | 94 | 6 | .234 | .205 |
| 4c | 19.8 | 94 | 6 | .235 | .222 |
| 4d | 19.8 | 94 | 6 | .231 | .217 |
| 4e | 19.8 | 94 | 6 | .229 | .215 |
| 4f | 19.8 | 94 | 6 | .235 | .215 |
| 4g | 26.8 | 94 | 6 | .219 | .208 |
| 4h | 26.8 | 94 | 6 | .226 | .212 |
| 4i | 26.8 | 90 | 10. | 216 | .210 |
| 4j | 26.8 | 90 | 10. | 218 | .209 |

Example 5

Samples 5a–5i were produced to demonstrate the moisture barrier of HCPP/PP-based film structures containing varying levels of resin modifier. A masterbatch of 85% PP and 15% resin modifier (ESCOREZ) was blended with HCPP (Amoco 9218) and thereafter coextruded with skin layers of an ethylene-propylene random copolymer (Fina 8573HB) to produce an ABA extrudate having a thickness of 27 microns. The ABA extrudate was stretched 4.3 times in the machine direction and 9 times in the transverse direction.

| Sample | HCPP (%) | PP (%) | Resin Modifier (%) | WVTR (Ambient) | WVTR (Aged) |
|---|---|---|---|---|---|
| 5a | 60 | 34 | 6 | .220 | .203 |
| 5b | 60 | 34 | 6 | .215 | .208 |
| 5c | 60 | 34 | 6 | .224 | .213 |
| 5d | 60 | 34 | 6 | .221 | .217 |
| 5e | 60 | 34 | 6 | .249 | .220 |
| 5f | 33 | 57 | 10 | .216 | .210 |
| 5g | 33 | 57 | 10 | .229 | .206 |
| 5h | 0 | 85 | 15 | .233 | .223 |
| 5i | 0 | 85 | 15 | .239 | .219 |

Example 6

Samples 6a–6g set forth the average values of stiffness and moduli for the identified films of Examples 1, 4 and 5.

| Sample | Average of Samples | Stiffness MD (g/4 in) | TD | Moduli MD (ksi) | TD |
|---|---|---|---|---|---|
| 6a | 1 | 7.5 | 12.3 | 369.0 | 703.0 |
| 6b | 4a–4f | 7.6 | 12.1 | 435.0 | 780.8 |
| 6c | 4g–4h | 16.1 | 25.5 | 452.0 | 803.0 |
| 6d | 4i–4j | 16.7 | 26.7 | 444.5 | 814.5 |
| 6e | 5a–5e | 15.4 | 24.6 | 421.1 | 796.8 |
| 6f | 5f–5g | 15.9 | 24.0 | 420.5 | 769.5 |
| 6g | 5h–5i | 15.2 | 22.0 | 415.0 | 692.0 |

Example 7

Samples 7a–7f were produced to demonstrate the dimensional stability of HCPP/PP-based film structures containing varying levels of resin modifier. A masterbatch of 80% PP and 20% resin modifier (ESCOREZ) was blended with HCPP (Amoco 9218) and thereafter coextruded with skin layers of an ethylene-propylene random copolymer to produce an ABA extrudate having a thickness of 25 microns. The ABA extrudate was stretched 4.3 times in the machine direction.

| Sample | TD (x) | HCPP (%) | PP (%) | Resin Modifier (%) | MD Dim. Stability (-% @275 F) | TD Dim. Stability (-% @275 F) |
|---|---|---|---|---|---|---|
| 7a | 9 | 100 | 0 | 0 | 2.5 | 3.7 |
| 7b | 9 | 50 | 40 | 10 | 3.3 | 3.3 |
| 7c | 9 | 0 | 80 | 20 | 4.7 | 6 |
| 7d | 12 | 100 | 0 | 0 | 1.9 | 4.2 |
| 7e | 12 | 50 | 40 | 10 | 5.9 | 7.9 |
| 7f | 12 | 0 | 80 | 20 | 7.3 | 6.9 |

It is thus readily apparent from the data set forth above that the present invention provides a film structure exhibiting improved WVTR (as compared to the prior art film of Example 1), having improved stiffness and moduli (as compared to the prior art film described in Sample 6a), maintaining dimensional stability (as shown in Example 7) and providing ease of manufacturing, e.g., increased line operability and line percentage uptime (as observed during manufacture of the present film structures).

While there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. A polymeric film, comprising:
   a base layer including a blend of a first polypropylene polymer having an isotactic stereoregularity of greater than about 93%, a second polypropylene polymer having an isotactic stereoregularity of from about 90% to about 93%, and a resin modifier at a loading level up to about 9% by weight of said base layer.

2. The film of claim 1, wherein said base layer includes an amount of said first polypropylene effective to provide said base layer with a moisture barrier versus resin modifier loading level curve having a substantially zero slope at loading levels of resin moisture greater than about 9%.

3. The film of claim 1, wherein said base layer includes from about 60% to about 94% by weight of said first polypropylene, from about 3% to about 37% by weight of said second polypropylene and from about 3% to about 9% by weight of said resin modifier.

4. The film of claim 1, wherein said first polypropylene has an isotactic stereoregularity of from about 94% to about 98%.

5. The film of claim 1, wherein said resin modifier is a hydrogenated hydrocarbon.

6. The film of claim 5, wherein said hydrogenated hydrocarbon is a hydrogenated hydrocarbon resin.

7. The film of claim 1, wherein said mixture further comprises an additive selected from the group consisting of antiblocking agents, antistatic agents and slip agents.

8. The film of claim 1, further comprising at least one skin layer adhered to at least one side of said base layer.

9. The film of claim 8, wherein said skin layer is selected from the group consisting of ethylene-propylene random copolymers and ethylene-propylene-butene-1 terpolymers.

10. The film of claim 8, wherein said skin layer further comprises an additive selected from the group consisting of antiblocking agents, antistatic agents, slip agents and silicone oil.

11. The film of claim 8, wherein said skin layer includes an amount of an antiblocking agent effective to reduce blocking of such film during winding thereof and an amount of a silicone oil effective to maintain a low coefficient of friction on the exposed surface thereof.

12. The film of claim 11, wherein said skin layer includes from about 1000 ppm to about 3000 ppm by weight of said skin layer of said antiblocking agent and from about 0.5% to about 2.0% by weight of said skin layer of said silicone oil, said silicone oil exhibiting a viscosity of from about 10,000 centistrokes to about 60,000 centistrokes.

13. The film of claim 8, further comprising a coating layer on the outer surface of said skin layer.

14. The film of claim 13, wherein said coating layer is selected from the group consisting of acrylic, ethylene methyl acrylate, ethylene acrylic acid, polyvinylidene chloride and polyvinyl alcohol.

* * * * *